Oct. 31, 1950  S. TERRY  2,527,777

ASTROLOGICAL CLOCK DISK

Filed Aug. 8, 1949

Samuel Terry
INVENTOR
BY C. A. Knowles.
ATTORNEYS.

Patented Oct. 31, 1950

2,527,777

UNITED STATES PATENT OFFICE 2,527,777

ASTROLOGICAL CLOCK DISK

Samuel Terry, El Monte, Calif.

Application August 8, 1949, Serial No. 109,152

4 Claims. (Cl. 35—44)

This invention relates to an astrological dial in the nature of a means for use by followers of astrology for providing an instant knowledge of hours best adapted for various activities.

Thus, the influence of the various planets is an accepted fact by practitioners of astrology, who conscientiously endeavor to chart or guide their daily and hourly activities accordingly.

Heretofore, it has been difficult for one to guide his activities hourly, by reason of the absence of a means for providing instant knowledge as to which planet may be dominant each hour and minute of the day. The problem is complicated by the fact that each hour, a different planet becomes dominant, and by the fact that these hours must be reckoned from the hour and minute of sunrise on the particular day. The main object of the present invention is to provide an astrological dial which will give this instant knowledge to a follower of astrology.

Summarized very briefly, the invention comprises a disc-like transparent dial adapted to be secured to the front of any conventional clock; a rotatable mounting for said dial, whereby the dial can be adjusted to selected positions relative to the clock face; a minute scale and index arm that permits adjustment of the dial to the exact minute of sunrise; and means on the dial whereby one can see instantly which planet has domination at the particular time shown on the clock.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1:
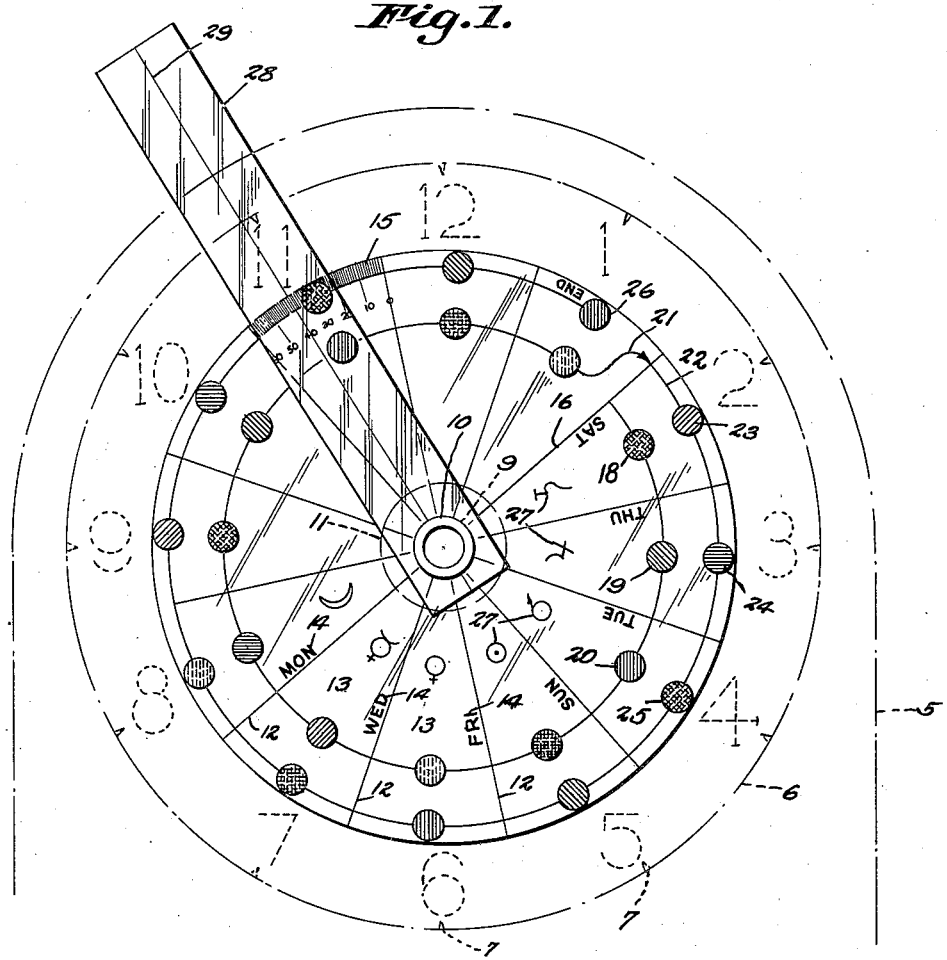
Fig. 1 is a front elevational view of an astrological dial formed in accordance with the invention, a clock on which the dial is mounted being shown in dotted lines.
Figure 2:
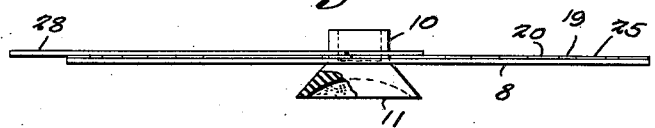
Fig. 2 is an edge elevation.

Referring to the drawings in detail, the reference numeral 5 designates a conventional clock having the face 6 provided with the usual hour markings 7.

The invention includes a disc 8 which preferably is of transparent plastic material so as to permit one to see the hour markings 7, and also the minute and hour hands of the clock. However, I can conceive of an instance in which the disc 8 might not necessarily be formed of transparent material, it being mainly essential that the disc be so formed as to permit one to see the hour markings of the clock, and at least the tips of the hour and minute hands of said clock.

Formed in the center of the disc 8 is an opening 9 receiving the upstanding neck 10 of a rubber suction cup 11 adapted to be secured to the exact center of the clock face 6, whereby the disc 8 is mounted more or less permanently upon the front of the clock for ready reference by the user. The rubber suction cup 11 provides a spindle or mount whereby the disc 8 is adapted to be rotated to selected positions of adjustment relative to the clock face 6, and it will be understood that there is a sufficiently tight engagement between the opening 9 and the neck 10 of the rubber suction cup as to cause the disc 8 to remain in any selected position to which it is rotatably adjusted.

Formed upon the face of the disc 8 are the equidistant radial lines 12 extending from the opening 9 of the disc fully to the disc's periphery. These define segmental spaces 13 each of which is traversed twice daily by the hour hand of a clock.

Within a number of the spaces 13 day indicia 14 are marked on the face of the disc 8, adjacent the radial line 12 on one side of said space. Additionally, on the margin of one of the spaces is provided a minute scale 15 marked off from zero to 60 minutes, for a purpose to become apparent hereinafter.

One of the radial lines 12 is a beginning or start line, and this is designated 16 and preferably is distinctively represented on the face of the disc, as by being, for example, a distinctive color or of double thickness.

From this beginning line 16 extends a spiralling line 17 which traverses each space 13, and within each space is provided with a means for indicating the planet dominating the particular hour represented by said space 13. In the form of Fig. 1, this means comprises a plurality of paper discs which are pasted upon the line 17, each of these discs being a different color to represent a different planet. These colors have been chosen in the present instance for visual clarity, and not for their esoteric relation to the hour they represent.

In any event, it may be noted that a paper disc 18 is of orange color, and represents Saturn. As the line crosses over into the next space 13 the disc 19 is green and represents Jupiter, dominant at that hour of the day. The next disc 20 is red and represents Mars. Other discs are yellow to represent the Sun, purple to represent Venus, brown to represent Mercury, and blue to represent the Moon.

It will be seen that the line 17 is disposed near the margin of the disc 8, and traverses all of the 12 spaces 13. As the line 17 approaches its starting point, it is swung outwardly as at 21, and becomes an outer line 22 which traverses the spaces 13 over the remaining 12 hours of the day. The outer line 22 is also provided with colored discs, as at 23, 24, 25 etc., respectively designating Mercury, the Moon, Saturn, and so on. In other words, there are in effect two circumferentially extending lines 17 and 22, respectively, with the inner line being read first and the outer line being read for the second 12 hours of a particular day.

The outer line 22 terminates in the last space 13, with a disc 26 colored red to represent Mars.

Within each of the first seven spaces 13, there are provided not only the day markings, but the symbols of the particular planets dominant on the respective seven days, these symbols corresponding to the discs on the inner line 17. For example, in the space 13 for Saturday, the disc 18 is orange for Saturn, and the symbol 27 is the zodiacal symbol for Saturn. The next space is for Thursday and the disc 19 is green for Jupiter, while the symbol 27 is the accepted symbol for this planet.

Mounted for radial swinging movement upon the spindle 10 is a transparent index arm 28 that overlies the face of the disc 8, and which is provided with a radially extending hair line 29 to be used in association with the minute scale 15.

In use, each day the disc 8 is adjusted to a selected position relative to the clock face 6, and is left in this position until the next day. In adjusting the disc 8 to the desired position at the beginning of the day, one first obtains information, as from any reputable almanac, as to the time of sunrise on that day. For example, assume that on a particular day the sun rises at 4:40 a. m., and that this day is a Sunday. Accordingly, the user adjusts the disc 8 rotatably until the radial line 12 marked "Sunday" is positioned exactly at 4 o'clock on the clock face 6. Then leaving the disc 8 in this position for a moment, the user swings the index arm 28 until the hair line 29 is exactly over the zero of the minute scale on the disc 8. Now, the index arm 28 is held firmly while the disc 8 is turned clockwise until the hair line 29 is disposed exactly upon the line marked "40" on the minute scale.

The dial or disc is now set for 4:40 on Sunday morning and is left in this position for 24 hours, or rather until sunrise on Monday morning on which the next adjustment is made.

As a result of the above adjustment, the astrological dial is ready for instant reference by the user throughout Sunday and until sunrise on Monday morning. In using it, he notes the position of the hour hand, and is guided accordingly. In other words, on the occasion given as an example, from 4:40 a. m. to 5:40 a. m. the hour hand will be under the space marked "Sunday" and the user, noting the symbol on the inner circumferential line 17, is guided according to the influences which followers of astrology consider the sun as exerting. Thus, he will consider this hour as best for writing letters, spiritual improvement, seeking advice, etc.

Further, since this would be a Sunday, he would consider the influence of the Sun as being of double strength in Sun hours, Sun hours on Sunday being 4:40 a. m. to 5:40 a. m. in the particular example given, 11:40 a. m. to 12:40 p. m., and 6:40 p. m. to 7:40 p. m.

In other words, once the dial is set on a particular day, one starts out by following the inner line 17, and switches over to the outer line 22 at the end of 12 hours, by following the outwardly turned line 21 to said outer line 22.

Due to the mechanical arrangement of the dial, only Saturday has a full 24 hour reading and the other 6 days vary. On days other than Saturday, a full 24 hour reading may be obtained by simply turning the dial until the Wednesday line 12 takes the place of the beginning line 16. Then, the user continues reading the outer circle until sunrise.

Figure 3:
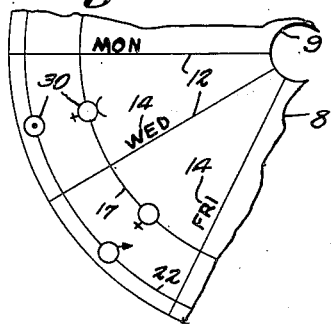
Fig. 3 is a fragmentary top plan view of a modified form.

In the form of the invention as illustrated in Fig. 3, the difference between this form and the first form resides simply in the use of the zodiacal symbols 30 themselves in place of colored discs. Otherwise the markings and manner of operation are the exact same.

What is claimed is:

1. An astrological dial including a disc having indicia thereon to divide said disc into sections defining hours of planetary influence, means for mounting said disc rotatably upon the face of a clock, a minute scale on one of said sections, and an index arm mounted for swinging movement on said means independently of the disc and cooperating with said scale.

2. An astrological dial including a disc having a plurality of radial lines dividing said disc into segmental sections, said sections being marked to designate spheres of planetary influence, a rubber suction cup on which said disc is rotatably mounted and adapted for securing the disc to the face of a clock, an index arm mounted for independent rotation on said suction cup, and a minute scale on one of the sections of the disc adapted to cooperate with the index arm in effecting minute adjustments of the disc upon the clock.

3. An astrological dial including a flat disc having radial markings to designate segmental sections each of which is to define an hour of planetary influence, inner and outer circumferential lines on which symbols of said influence are marked and disposed adjacent the marginal portion of the disc, a minute scale on the marginal portion of one of the sections, a rubber suction cup including a spindle, said disc being mounted for rotatable adjustment on said spindle, and an index arm mounted on said spindle for radial swinging movement and having a hair line cooperating with the minute scale.

4. An astrological dial of transparent material and formed in the shape of a disc having a center opening, there being radial markings equidistant from each other and extending from the center opening to the margin of the disc, said markings defining spaces each of which is in the shape of a segmental section and is adapted to define a period of influence of a particular planet, inner and outer lines extending circumferentially of said disc and traversing the respective sections, symbols on said inner and outer lines designating planets influencing said sections, a rubber suction cup including a neck, said neck being received in the opening of the disc and adapting the disc to overlie the face of a clock on which the rubber suction cup is secured, said disc being adapted for rotatable adjustment upon said neck of the suction cup, a transparent index arm extending radially from and mounted for swinging movement upon the neck of the rubber suction cup, a minute scale on said disc and extending throughout the marginal portion of one of the sections, and a hair line on said index arm adapted to cooperate with the markings on the minute scale, said index arm extending beyond the disc a substantial distance to permit the index arm to be held stationary while rotatable adjustment of the disc is being effected.

SAMUEL TERRY.

No references cited.